United States Patent [19]

Houben et al.

[11] Patent Number: 5,052,497
[45] Date of Patent: Oct. 1, 1991

[54] APPARATUS FOR DRIVING A DRILLING OR PERCUSSION TOOL

[75] Inventors: J. P. Houben, Breda; A. J. Moolenaar, Dorst, both of Netherlands

[73] Assignee: Emerson Electric Company, St. Louis, Mo.

[21] Appl. No.: 360,316

[22] Filed: Jun. 2, 1989

[30] Foreign Application Priority Data

Jul. 7, 1988 [NL] Netherlands .................. 8801466

[51] Int. Cl.$^5$ ............................................ B25D 11/04
[52] U.S. Cl. .................................... 173/109; 173/119; 173/122
[58] Field of Search ................. 173/48, 104, 105, 106, 173/107, 108, 109, 110, 119, 112, 163, 165, 122

[56] References Cited

U.S. PATENT DOCUMENTS

| | | | |
|---|---|---|---|
| 3,685,594 | 8/1972 | Koehler | 173/48 |
| 4,325,436 | 4/1982 | Richter et al. | 173/13 |
| 4,446,931 | 5/1984 | Bletcher et al. | 173/48 |
| 4,487,272 | 12/1984 | Bletcher et al. | 173/48 |
| 4,641,714 | 2/1987 | Ferioli | 173/119 |

Primary Examiner—Frank T. Yost
Assistant Examiner—Scott A. Smith
Attorney, Agent, or Firm—Jones, Day, Reavis & Pogue

[57] ABSTRACT

This invention relates to a device for driving a drilling or percussion tool having a spindle that rotates with respect to a housing. One end of the spindle is adapted to fasten to a tool piece and the other end is connected to an osciliating percussion body movable in the housing by means of a guideway. A drive shaft rotates the tool spindle into rotation or actuates the percussion body via a transmission that is provided with means for converting the rotary motion of the drive shaft into an oscillatory motion of a drive member. The drive member is connected to the percussion body through an elastic member having a non-linear spring characteristic.

58 Claims, 9 Drawing Sheets

APPARATUS FOR DRIVING A DRILLING OR PERCUSSION TOOL

BACKGROUND OF THE INVENTION

This invention relates to a device for driving a drilling or percussion tool having a spindle that rotates with respect to a housing.

A device of this kind has been previously described in European patent application 84201720.4, upon which foreign priority is claimed by the applicant.

The present invention improves the means for converting the rotary motion of the drive shaft into an oscillatory motion of a drive member, and improves an associated elastic member, resulting in a design which is simple in construction, and a drilling or percussion tool which occupies less space and has a more favorable weight. One end of the spindle is adapted to fasten to a tool piece and the other end is connected to an oscillating percussion body movable in the housing by means of a guideway. A drive shaft rotates the tool spindle into rotation or actuates the percussion body via a transmission that is provided with means for converting the rotary motion of the drive shaft into an oscillatory motion of a drive member. The drive member is connected to the percussion body through an elastic member having a non-linear spring characteristic.

According to the invention the improved device is distinguished in that the drive member is mounted on the drive shaft or a shaft coupled therewith, which may take place at an angle deviating from 90 degrees to the center line thereof, and the elastic member is rotatably connected to the drive plate-like member, which is provided with a coupling means for engaging the percussion body.

Owing to the direct mounting of the drive member on the shaft associated therewith, the conversion mechanism can be made particularly simple and small. Moreover, the frequency of the oscillating motion can be boosted considerably, with retention of sufficient energy per stroke, which in some embodiments has a considerably better percussion effect on the intended workpiece.

In the preferred embodiment the coupling means is a tongue fastened to the plate which projects into an aperature arranged in the percussion body. In this embodiment the percussion body can be made small and is thereby suitable for high oscillation frequencies.

It can be advantageous to give the aperature a larger dimension in the direction of the stroke than the tongue of the elastic member, so that the desired non-linear spring characteristic is also obtained by using a plurality of stiff elastic members.

In another embodiment there is arranged extending along the elastic member a spring plate wherein the spring constant is less than that of the elastic member Since the spring plate will be cushioned during the movement to a greater or lesser extent against the elastic member, a non-linear spring characteristic results.

If the drive member is mounted directly onto the motor shaft, it is preferable to provide the drive member on the motor side with a clutch, through which not only is assembly simplified, but the bending loads on that shaft will be reduced.

The invention further relates to a device which is provided with a percussion mechanism, for instance in the form described above, wherein the percussive force is transmitted directly to the tool piece to be coupled to the tool spindle. To that end the tool spindle is provided according to the invention with a tool-holding body, which is made with means for the rotation-proof fastening of a tool shank in the tool holder, which nonetheless permits an axial movement of the tool with respect to the drive shaft.

The above and other characteristics will be further elucidated in the detailed description below of a number of alternative embodiments.

BRIEF DESCRIPTION OF THE DRAWINGS

FIG. 6 shows a cross section view according to the line VI—IV in FIG. 5a.

DETAILED DESCRIPTION OF THE PREFERRED EMBODIMENT

Figures 1, 2:
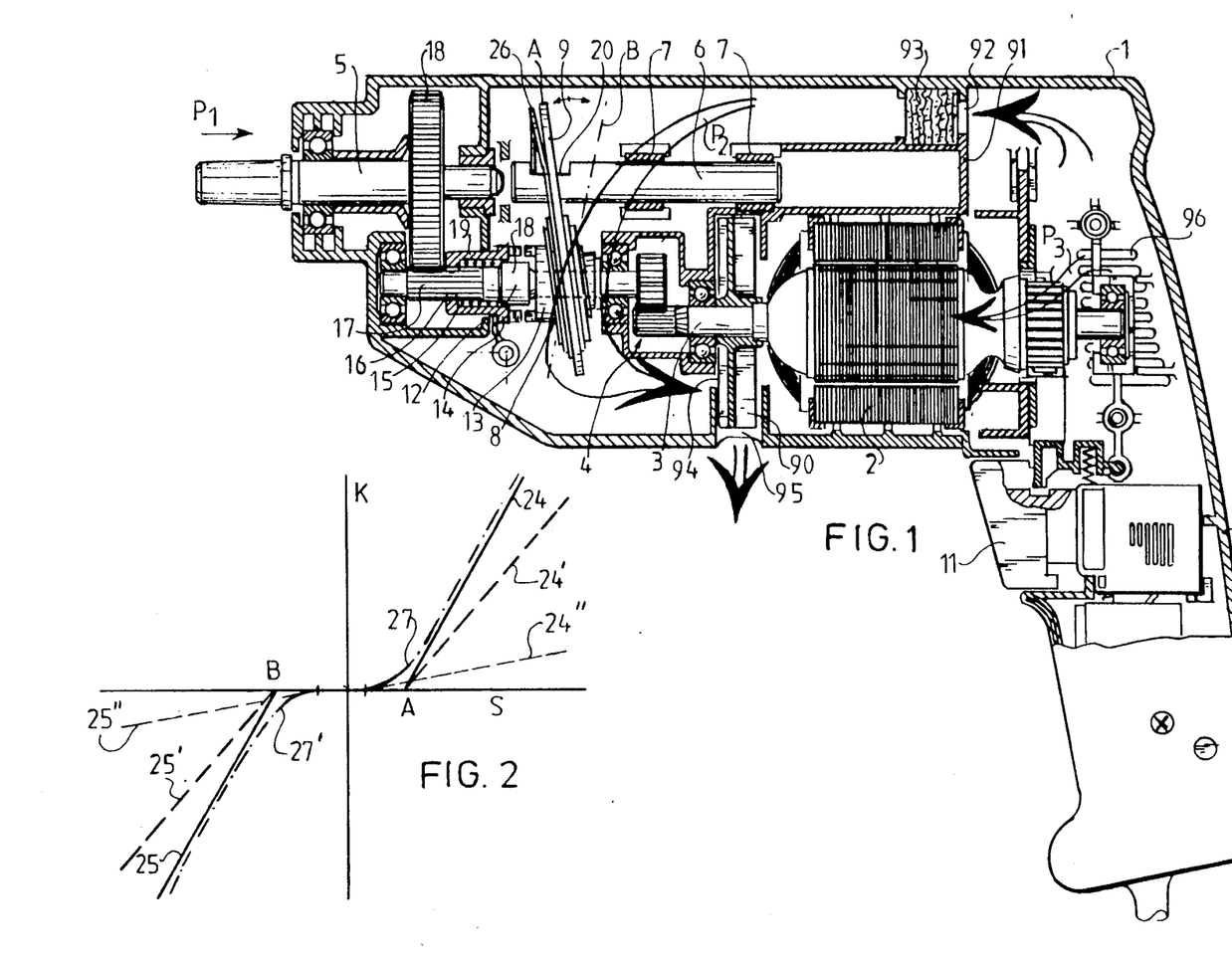
FIG. 1 shows an axial section of a device according to the invention which is embodied as an electrical hand tool.
FIG. 2 shows a tension-deflection characteristic of an elastic member proposed according to the invention.

Reference number 1 indicates the housing of an electric drilling tool which comprises in the usual way a electric motor 2, for instance the collector type, and also cooperating with the drive shaft 3 is transmission 4 in the form of a double gear wheel drive and a tool spindle 5. A tool (not shown) can be fastened at the free end of the tool spindle 5 in arbitrary manner. At the opposite inner end of the tool spindle 5 an extension thereof there is included a percussion body 6 which is movable through slide bearings 7 to and fro in the housing 1 in a freely slidable way. The driving of the percussion body 6 for engendering reciprocating movement thereof is possible by means of a driving body 8 with an associated elastic member 9, whereof the construction and the operation will be further elucidated hereinbelow.

It should be mentioned in this connection that according to the known embodiments for hand tools, the housing is provided with a handgrip 10 in which a switch 11 is mounted for the empowerment and switching off of the electric motor 2. The operation and the function of the switch 11 forms no part of the invention and is assumed known, as is equally the principal operation of the electric motor 2 for driving the tool spindle 5 through the transmission 4.

There now follows a description of the driving of the percussion body 6 by means of the drive member 8 and elastic member 9. To that end reference is also made to the cross section on enlarged scale according to FIG. 3.

Figure 3:
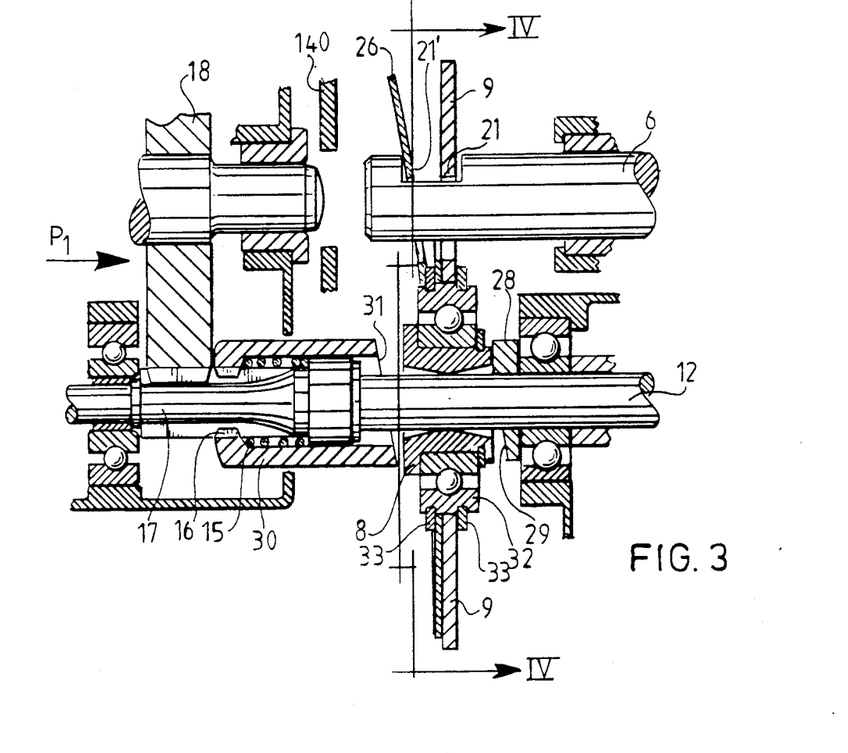
FIG. 3 shows an axial section corresponding to FIG. 1 of a part of the device on an enlarged scale.

On the intermediate shaft 12 of the transmission, drive member 8 is supported, the manner of support being modified according to the embodiment of drive member 8. Drive member 8 can extend a fixed angle deviating from 90 degrees with respect to the center line of intermediate shaft 12, this and other matters being so arranged that elastic member 9, in the form of a plate to be described in further detail hereinbelow, similarly extends an angle deviating from 90 degrees to the center line of intermediate shaft 12. On rotation of the shaft 12 drive member 8 with elastic plate 9 will therefore come to acquire a rocking motion which extends between position A (drawn with sold lines in FIG. 1) and position B (drawn with broken lines). It is observed thereby that plate 9 is mounted rotatably on drive member 8, so that plate 9 undergoes an exclusively reciprocating motion, while drive member 8 rotates together with shaft 12. The connection between drive member 8 and shaft 12 is brought about via an axial claw coupling, whereof member 13 is fixed firmly to drive member 8, and member 14 is slidable with a sleeve 15. Sleeve 15 has a passage opening with internal toothing 16, which cooperates with toothing 17 on shaft 12, which toothing 17 engages with gear wheel 18 of tool spindle 5. Moreover, shaft 12 is provided with a shoulder 18, compression spring 19 being held between shoulder 18 and sleeve 15.

It is further observed that tool spindle 5 is mounted to a certain extent axially slidably in the bearing of the housing, so that on the impression of tool spindles in the direction of arrow Pl, gear wheel 18 is carried therewith to the right, which slides sleeve 15 along to the right and causes member 14 of the dog clutch to engage with member 13 and thus with drive member 8.

The elastic plate-shaped member 9 has a bushing through which percussion body 6 is freely movably housed, whereby it is to be understood that body 6 displays a notch 20 at the level of the plate. Into this notch projects tongue 21 of plate 9 (see FIG. 4), this and other matters being so arranged that on reciprocating motion of plate 9 from Position A to position B, and vice versa, tongue 21 thrusts against the end faces of notch 20, through which percussion body 6 is carried in a retarded manner along with the motion of plate 9. The dimensioning of the stroke of plate 9 is such that percussion body 6 repeatedly hits against the free end of tool spindle 5, whereby a hammering effect results.

The working of the device described above is therefore as follows: as drive shaft 3 is made to rotate, the intermediate shaft 12 will be brought into rotation through the first gear wheel transmission, which intermediate shaft 12 causes via the second gear wheel transmission, gear wheel 18 to rotate and thereby rotate tool spindle 5; when tool spindle 5 is impressed, which occurs through the placing of the tool against the workpiece, the shaft is pushed into the housing 1, through which dog clutch 13 and 14 come into action and plate 9 will undergo a reciprocating motion. This will cause percussion body 6 to move to and fro in housing 1 and repeatedly strike against tool spindle 5, through which the combined rotary and percussion drilling effect is brought about.

In the above described embodiment, a non-linear spring characteristic is obtained simply by adopting a relatively stiff plate as the elastic member 9.

This and other matters are shown in the force-distance curve in FIG. 2, wherein the deflection S of the elastic member is shown horizontally and the associated force K is shown on the vertical axis. Since spring plate 9 has a normal linear spring characteristic, this characteristic can be indicated by straight line 24. This straight line intersects the horizontal line at point A, which indicates the one position of spring plate 9 with respect to notch 20, of which the longitudinal dimension corresponds to the line segment AB. The linear characteristic will continue on the left-hand side of the vertical axis in the system of FIG. 2 according to straight line 25. On account of the stepped form of line 24 and 25, the desired non-linear characteristic is obtained, which is necessary for the special working of the device according to the invention. With a less stiff plate 9, a more strongly inclining characteristic will be obtained, as is indicated by the lines 24' and 25' respectively.

In particular embodiments it can be advantageous to arrange a second elastic plate next to elastic plate 9, as is indicated by 26 in FIG. 1. The second elastic plate 26 (see also FIGS. 3 and 4) has a more pliant spring characteristic and therefore a lower spring constant than plate 9. In the interval AB the spring characteristic indicated by lines 24" and 25" will, for example, be followed until plate 9 cooperates. The lines 24" and 25" intersect the S axis at points C and D. The distance CD is the clearance between the spring systems and notch 20 of percussion body 6. A construction of the kind will at least cause the sharp angle between the segments BA and 24 to take a smoother course, as is indicated by-line segment 27. If there is also a second spring plate 26 arranged to the right side of plate 9, this smoothed course can equally be brought about on the left-hand side of the vertical axis of the system in FIG. 2 according to line 27.

The embodiment according to FIG. 3 departs from that in FIG. 1 insofar as that dog clutch 13 and 14 is omitted in this instance. The drive body 8 is shaped here in the form of a rounded rectangular shoulder with respect to shaft 12 tiltable bush, which is clasped firmly mounted collar 28 between a on shaft 12 with an oblique thrust surface 29 and a freely slidable sleeve 30 with respect to shaft 12, also with an oblique thrust surface 31. The thrust surfaces 28 and 31 lie mutually parallel to each other.

The sleeve 30, is in the manner described hereinabove according to FIG. 1, and is similarly moveable toward the right by gear wheel 18 in opposition to the pressure of compression spring 15. When the gear wheel 18 is moved toward the right, the thrust surfaces 29 and 31 will hence be moved toward each other, so that drive member 8 is set into a position deviating from 90 degrees with respect to shaft 12. In this way the elastic plate 9 will similarly be made to incline in a position between the extremes A, B in FIG. 1.

It is also observed that plate 9 is mounted with respect to drive member 8 by means of a radial ball bearing 32. To that end plate 9 is fastened between two normal spring washers 33 on the outer ring of the ball bearing housing 32. In a corresponding way, an optional spring plate 26 is mounted.

Figure 5A:
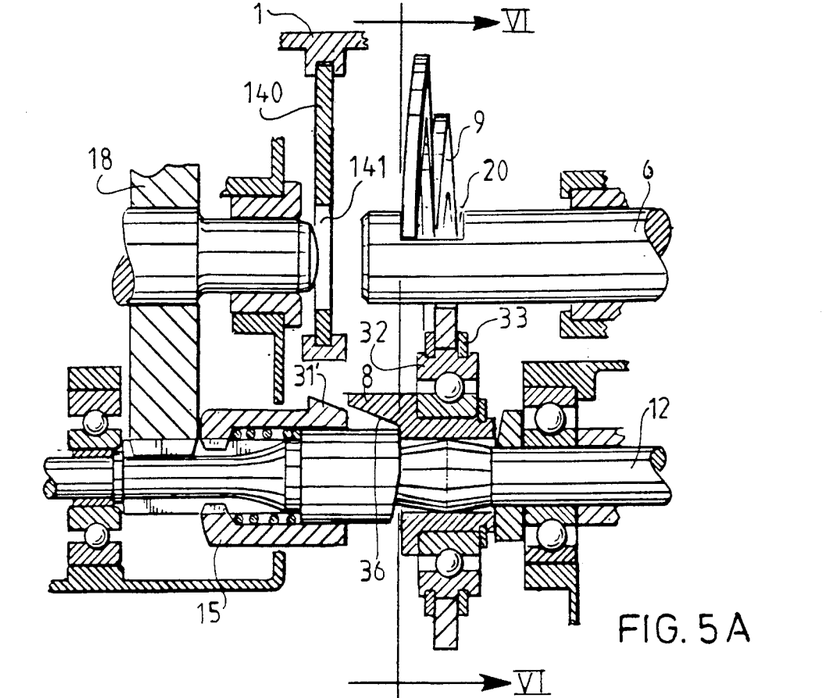
FIGS. 5a and 5b show a cross section corresponding to FIG. 3 of two versions of a part of the device on an enlarged scale.
Figure 5B:
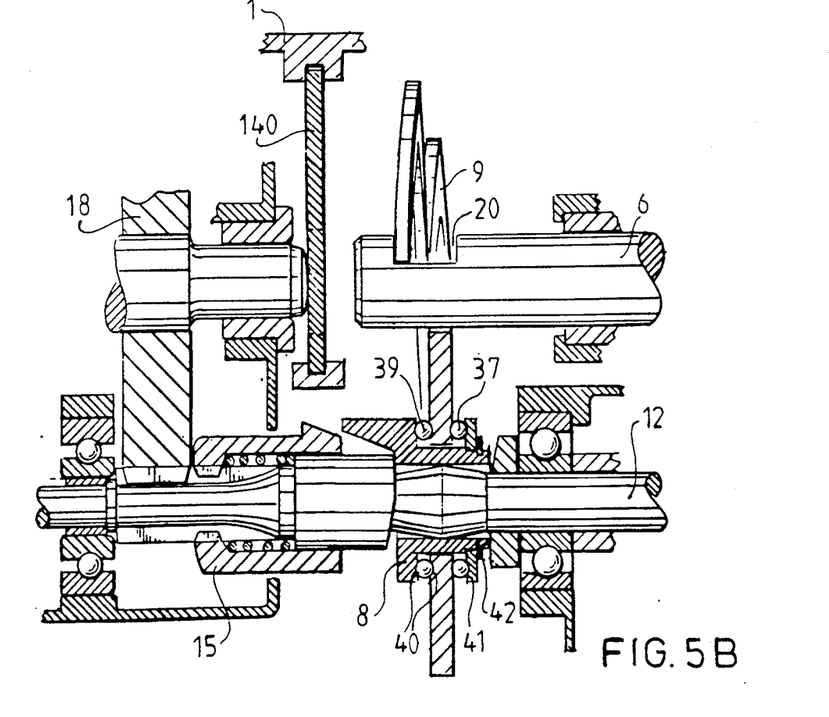
Figure 6:
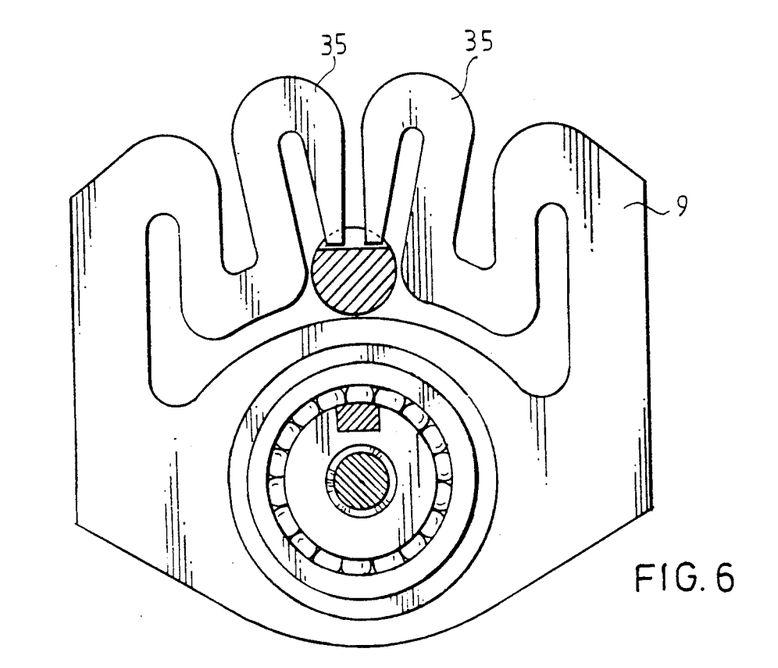

The FIGS. 5a, 5b and 6 show an alternative embodiment of the driving mechanism for the percussion body 6. Identical components are indicated by the same reference numerals.

Noteworthy is the form of spring plate 9 as an elastic body. A second spring plate 26 is not used here, but plate 2b is executed with a circuitous-shaped or meandering tongue 35, of which there are two arranged on each opposing side of Plate 9, such that a lower spring constant is brought about. The extremity of the tongue again projects into notch 20 in Percussion body 6.

The plate 9 is here too clamped between two spring washers 33 on the outer race of a radial ball bearing. The radial ball bearing is fastened to drive body 8, which is arranged tiltably with respect to intermediate shaft 12. The drive body 8 is tilted by means of a sliding bushing 15, which is now provided with a radially directed steering surface 31', which cooperates with a radially inward facing steering surface 36 of driving member 8. Through the movement of bushing 15 toward the right against the pressure of a compression spring, steering surface 31 will come into contact with steering surface 35 and cause member 8 to tilt. Through this plate 9 acquires an angle deviating from 90 degrees with respect to intermediate shaft 12 and plate 9 can rock to and fro between the two extreme positions A and B in the manner described above. The extremities of the tongues 35 will deflect out of the plane of plate 9, through which a lower spring constant results. Hence the line 24'/25' in FIG. 2 can be achieved.

FIG. 5b departs from the embodiment according to FIG. 5a with respect to the mounting of plate 9 in relation to drive member 8. To that end, use is not made of the radial ball bearing 32, but of an axial thrust bearing 37, whereby each ball bearing 39 is mounted between plate 9 and on the one side an axial wall member 40 of drive member 8 and on the other side, ring 41. The ring 41 is mounted on a reduced portion of the drive member 8 by means of a spring washer 42. The drive member is here, similarly corresponding to FIG. 5a, tiltable by means of sleeve 15, which is slidable to the right.

Figure 4:
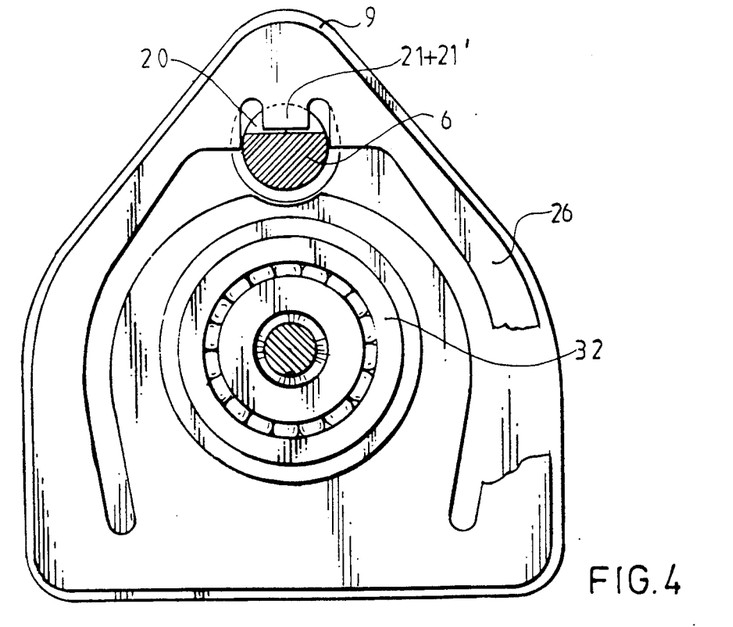
FIG. 4 shows a cross section view according to line IV—IV in FIG. 3.
Figure 7:
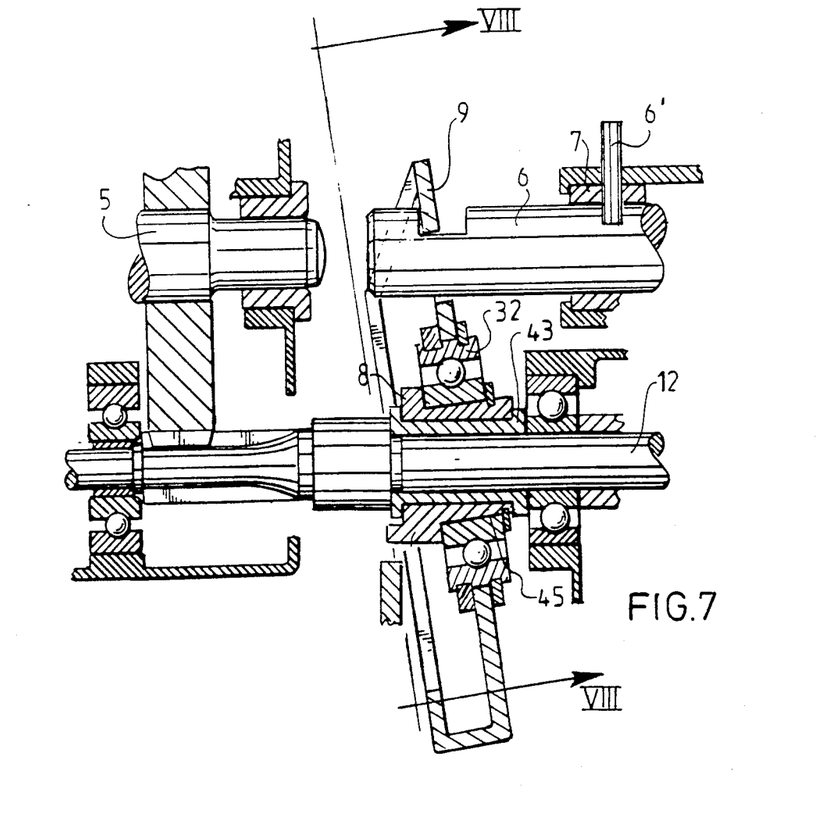
FIG. 7 shows a cross section corresponding to FIG. 3 of a fourth version of a part of the device on an enlarged scale.
Figure 8:
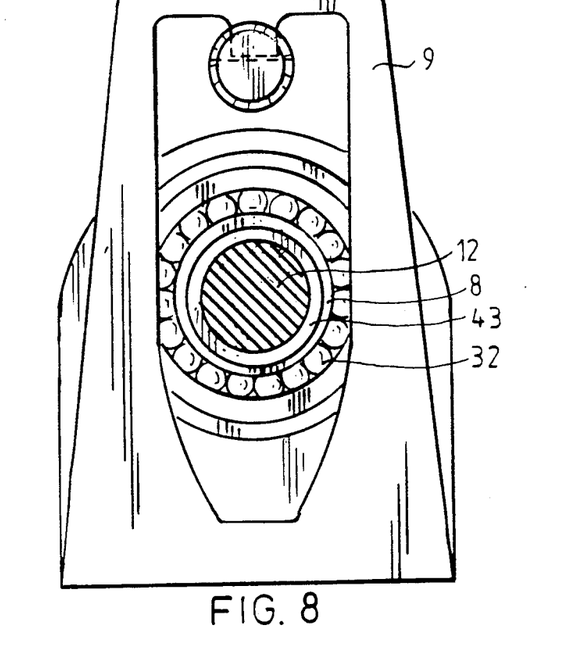
FIG. 8 shows a cross section view according to the line VIII—VIII in FIG. 7.

FIGS. 7 and 8 show that the elastic member in the form of a stiff plate 9 cooperates with a specially shaped spring Plate 26, which is made more pliable in comparison to the spring plate in FIG. 4. Through this sharper transitions results at the points A and B of the spring tension-deflection characteristic in the system according to FIG. 2.

In this embodiment drive member 8 is executed with a bearing ring 43 arranged directly on the intermediate shaft, around which ring a second bearing ring 44 is mounted whereof the outer surface displays portion 45, whereof the center line forms an angle with that of the drilled hole in the shell 43. In this way a radial ball bearing 32 arranged on this outer surface 35 can adopt an oblique position with respect to the intermediate shaft 12, and the spring plate 9 which is mounted in the manner according to FIG. 5a.

In this embodiment the clutch between intermediate shaft 12 and drive body 8 is absent. The hammering operation of percussion body 6 can be inactivated by fixing this body in the drawn position, for example by passing a pin 6' through a hole in the slide bearing 7 into the percussion body 6.

Figure 9:
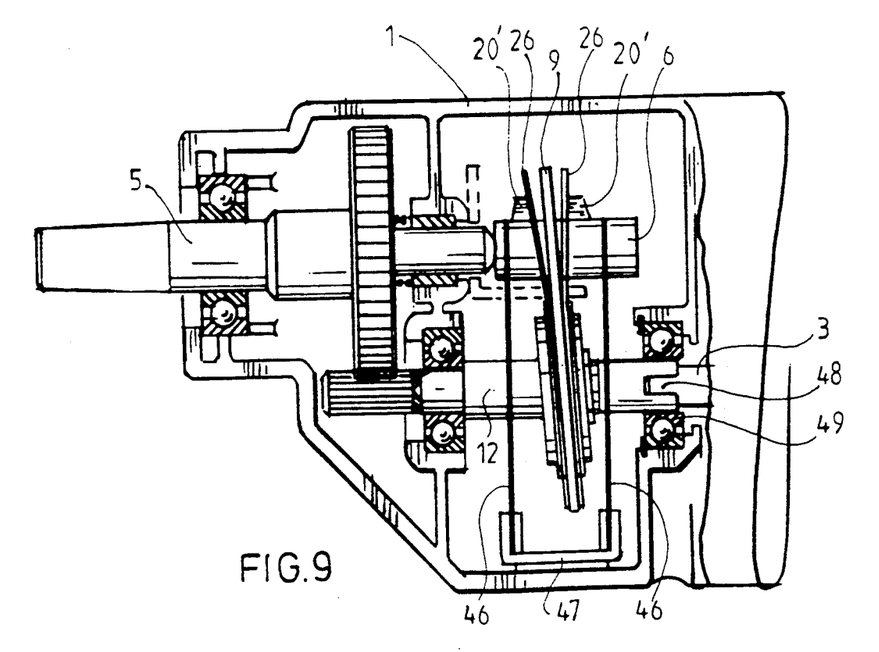
FIG. 9 shows a longitudinal section of a part of the device of FIG. 1 according to a fifth version on an enlarged scale.

FIG. 9 shows an embodiment in which percussion body 6 is not accommodated in a sliding support in housing 1 but is suspended in two parallel spring plates 46. The lower end of each plate 46 is fastened in a support 47 of the housing 1. The free upper end of each plate 46 is firmly secured to percussion body 6. A displacement of percussion body 6 to the right or to the left respectively in FIG. 9, results in a translation of percussion body 6, one of the end positions being drawn in the FIG. 9, in this instance in contact with the free end of tool shaft 5.

To this embodiment percussion body 6 is not made with a notch but with two projections 20' which are arranged at a distance from each other. In the space between the projections 20', a tongue 21 of plate 9 can project. In this embodiment the plate is provided on both sides with a spring plate 26. It is clear that the forms of both plate 9 and of plate 26 may correspond to the plate forms described above and shown in the preceding figures The mounting of the plates 9 and 26 respectively can take place in the same way as in the various other embodiments.

Finally it is observed that shaft 12 for drive body 8 is not coupled to the drive shaft of motor 2 by means of a first transmission, but through a tongue and groove coupling 40, so that shaft 12 has the same rotation speed as the motor shaft 12. The coupling is located at the position of the first motor bearing 49, this and other details being such that assembly or disassembly of the motor 2 can take place without it being necessary to dismantle shaft 12.

Figure 10:
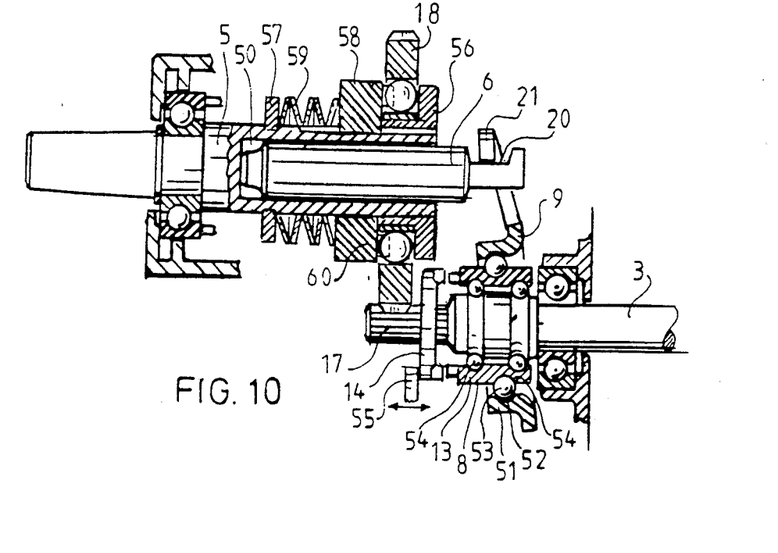
FIG. 10 shows a cross section corresponding to FIG. 9 of a part of the device according to a sixth version, however with portions of the housing of the device shown cut away.

FIG. 10 shows an embodiment in which percussion body 6 is guided in an axial blind drilled hole 50 in the tool spindle. The end of percussion body 6 projecting outside the drilled hole 50 displays notch 20, into which tongue 21 of spring plate 9 projects. The spring plate is turned over at a central portion 21 to form sleeve 51 in which groove 52 is arranged. In groove 52 a ball cage 53 can be accommodated which similarly runs in a sloping ball track 54 of the drive body 8. The drive body 8 is mounted directly onto the shaft 3 coming from the motor 2 by means of two radial ball bearings 55 separated by a mutual distance.

The motor shaft 3 is made with a toothed end portion 17 which cooperates with the gear wheel 18. The toothed portion 17 similarly engages with the slidable clutch member 14 of a dog clutch which cooperates with a clutch member 13 of drive member 8. The part 14 of dog clutch can be moved to the right or to the left respectively by any arbitrary means, for example by a separate actuation means 55, in order to bring about the coupling between shaft 3 and drive member 8.

It is further observed that a slip coupling in the form of a ball clutch is arranged between gear wheel 18 and tool spindle 5. The gear wheel 18 is mounted freely rotatable on tool spindle 5 between two fixed rings, 56 and 57 respectively. A slidable ring 58 can be pushed, owing to axial splines on the outside of tool spindle 5 and on the inside of ring 58 respectively, in the direction of the left side face of gear wheel 18 by means of a packet of cupped spring washers 59 which abut against the ring 57. Held in gear wheel 18 are balls 60 which are each pressed by ring 58 into one chamber of gear wheel 18. The ring is provided with ball-receiving pits.

On normal loading the force will be transmitted via gear wheel 18, ball friction clutch and ring 58 to tool spindle 5. On overloading, ring 58 will be moved to the left against the resistance of the cupped spring washers, whereby balls 60 are forced out of their pits in ring 58, whereby gear wheel 18 can turn freely with respect to ring 58. The construction shown offers the advantage that percussion mechanism 6 operates independently of the friction safety clutch.

Figures 11, 12:
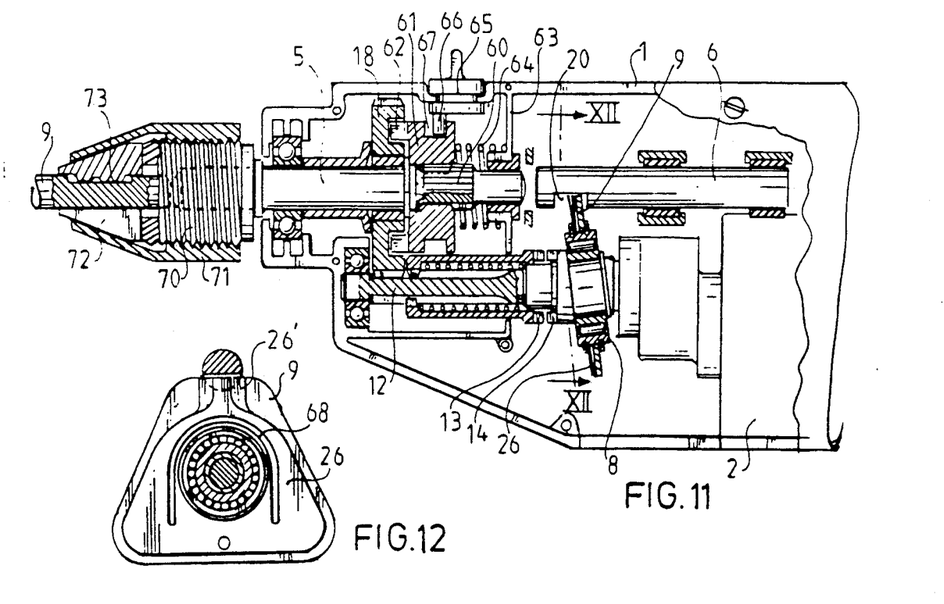
FIG. 11 shows a longitudinal section corresponding to FIG. 9 according to a seventh version of the device according to the invention.
FIG. 12 shows a cross section according to the line XII—XII in FIG. 11.

FIGS. 11 and 12 show a following embodiment in which the rotating drive of a tool can be inactivated while the percussion mechanism remains in operation. To that end tool spindle 5 is provided with a portion 60 with external splines, upon which is arranged a slidable ring with internal splines 61. In this way ring 61 is slidable in an axial direction with respect to spindle 5, but remains non-rotatable in respect thereof. On the side facing gear wheel 18 ring 61 is provided with dowels 62, which can engage with recesses in the side face of gear wheel 18. When the dowels 62 fall into these recesses, gear wheel 18 is non-rotatable with respect to ring 61. A compression spring is held between a wall member 63 of the housing 1 and ring 61.

At the top of housing 1 there is mounted a hand-operable rotary knob which is turnable around a vertical axis. On the underside of the knob there is arranged pin 66, which projects into an annular groove of ring 61.

Through the turning of knob 65 from the position shown in the drawing through an angle of 180 degrees, pin 66 will move to the right in FIG. 11, taking with it ring 61 in opposition to the pressure of compression spring 64. In that position the dowels 62 come to lie free of gear wheel 18, whence gear wheel 18 is freely rotatable with respect to ring 61 and hence freely rotatable with respect to tool spindle 5.

The other parts of the transmission agree with those described in the embodiment according to FIG. 1.

On the starting of the motor 2 in the shown situation, a rotational motion is impacted to tool spindle 5, since the intermediate shaft 12 brings gear wheel 18 into rotation, which transmits the rotational motion to ring 61 and thus to tool spindle 5. The drive member 8 comes into operation in the manner described hereinabove as soon as tool spindle 5 is moved towards the right in FIG. 11, whence clutch 13 and 14 are engaged and drive member 8 with plate 9 connected thereto acquires a rocking motion. This rocking motion is translated into a reciprocating motion of the percussion body 6.

If only a percussive motion is required, knob 65 may be turned around, through which ring 61 is moved to the right and the coupling between ring 61 and gear wheel 18 does not occur even when tool spindle 5 is impressed to the right. The rotary motion of intermediate shaft 12 is translated only into a driving of drive member 8 and the reciprocating motion of plate 9 and thus of percussion body 6. The gear wheel 18 revolves thereby freely on tool spindle 5 and tool spindle 5 will exert exclusively a hammering effect.

It is observed that notch 20 in percussion body 6 is located on the underside or on the side facing the intermediate shaft 12, so that plate 9 extends exclusively on the underside of percussion body 6. Here two spring plates 26 and 26' are arranged next to plate 9, a U-shaped fissure 68 being arranged for greater elasticity in one or both plates, whereby the spring length is increased.

In this embodiment an indication is also made of how the tool, for example a drill-bit G, should preferably be held. This may be with the known drill receiving device, which is screwed onto a screw thread of tool spindle 5. This holder device consists of a central part 70, around which a threaded part 71 is mounted. At the front of central part 70 and inside threaded part 71, wedge shaped jaws 72 are placed, whereof the inward facing parts 73 fall into recesses in the shank of the drill-bit G. The length of the parts 73 is less than the length of the recess in the drill-bit G, so that the drill-bit can undergo a certain axial movement with respect to the receiving apparatus, while nonetheless a rotary motion can be transmitted. In this way it is possible to mount the end face of the drill shank G directly against the end face of too spindles, so that the percussive energy is delivered from the percussion body 6 via tool spindle 5 directly to the drill-bit G.

Figures 13, 14:
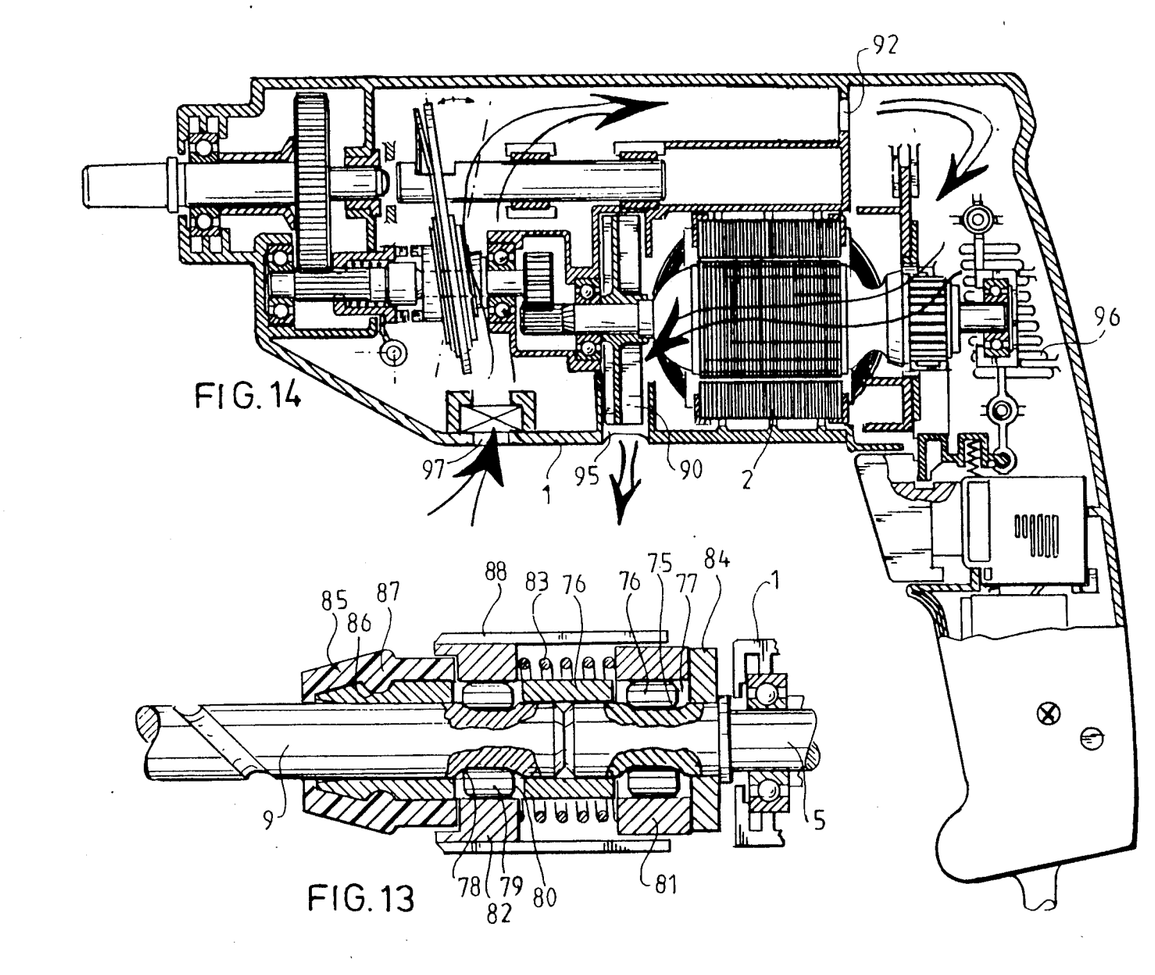
FIG. 13 shows a longitudinal section corresponding to FIG. 11 of a part of the device on an enlarged scale, in which a different tool holding means is shown.
FIG. 14 shows a cross section corresponding to FIG. 1, in which the air intake and outlet openings are disposed differently in the housing in order to achieve a different cooling air flow.

An alternative embodiment of the holder head is shown in FIG. 13, in which the portion of tool spindle 15 protruding form housing 1 is executed with regularly around the circumference hollowed out parts 75, into which roller bodies 76 fit. These lie enclosed (in both the axial and in the radial sense) in the recesses 75. Tool spindle end 5 also carries a sleeve-like housing 76' with recesses 77 similarly for the receiving of the roller bodies 76. The length of sleeve-like housing 76' is such that this can accommodate the shank end of the drill-bit G. This shank end is also made with recesses 78 for the accepting of roller bodies 79. The length of recess 78 is however here greater than that of the bodies 79, so that an axial movement of the shank G with respect to roller bodies 79 is possible, but not a radial movement. The roller bodies 79 fit analogously to the bodies 75 into chambers 80 of sleeve 76'. The bodies 75 and 79 respectively are held in their places by the appropriate rings 81 and 82 respectively which are mounted slidably on the outside of the sleeve 76'. Between the rings there is mounted a compression spring 83, which on the one hand ensures that ring 81 rests against a shoulder 84 of sleeve 76' and on the other hand ensures that ring 82 rests against the end face of a collar 85 mounted firmly on sleeve 76'. The collar 85 is, for instance, made of plastic material. For the fastening of the collar 85 on the sleeve 76', the latter is provided with a groove-shaped recess 86 in which a thickened edge 87 of the collar locks grippingly. The sleeve 76' with the members supported thereby, can be removed from the end of tool spindle 5 by sliding ring 81 to the left in opposition to the pressure of the compression spring 83, whence the roller bodies 76 can be moved out of the recesses 75, whereafter sleeve 76' can be removed. The refitting takes place in reverse manner.

The shank of drill-bit G can be fitted in a similar way by sliding ring 82 to the right in opposition to the pressure of spring 83.

For the purposes of protection, ring 82 may also be provided with a skirt part 88 extending over the compression spring 83 and partly over ring 81.

It is to be preferred that the percussion mechanism is cooled, to which end a motor housing 1 is normally provided with cooling are openings (see FIG. 1). According to the present invention it is recommended that the cooling air is passed forcibly along the percussion mechanism and that use is thereby made of the blade wheel 90 already present on electric motor 2. This twin blade wheel 90 serves for the usual cooling of the electric motor 2, but now also, after the making of appropriately disposed passage openings in the motor housing 1, for the creation of a cooling air stream along the percussion mechanism. To that end, in a partition 91 of the housing 1 there is made a passage opening 92, behind which a filter 93 is situated. Similarly there is made beneath the motor bearing a passage opening 94 (see FIG. 1) through which a cooling air stream results following arrows P2 and P3 along the percussion mechanism and the motor 2 respectively. The air stream can be discharged via the outlet opening 95. The intake of the air normally takes place through slit-shaped openings in the handgrip 10 of the housing 1.

FIG. 14 give a divergent configuration, in which on the underside of the housing 1 there is placed an intake opening 97. Owing to this opening 97, it is possible to carry the air stream via the percussion mechanism and passage opening 92, directly to motor 2 and to discharge the air stream through an outlet opening 95. In this embodiment passage opening 94 is absent.

Figure 15:
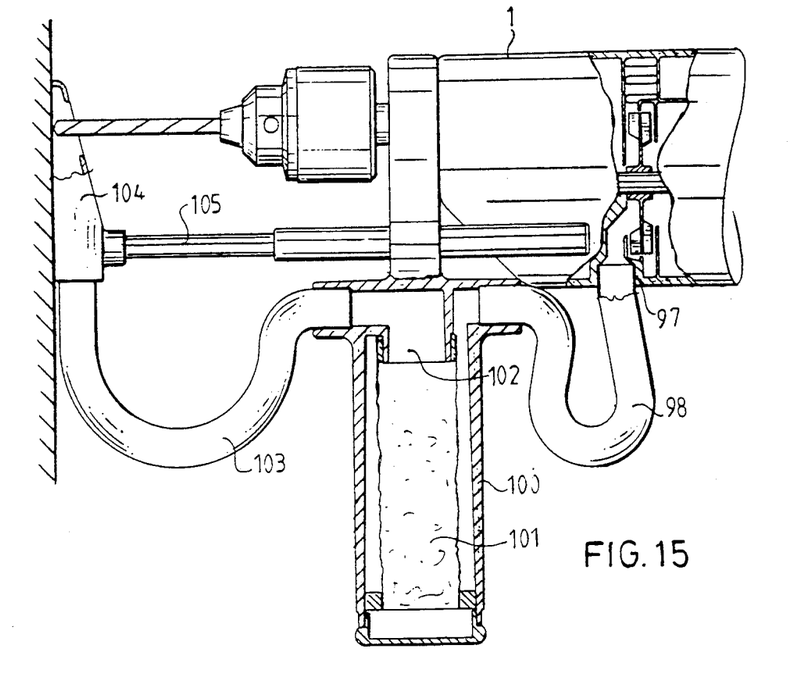
FIG. 15 shows a view of the front part of an electric hand tool provided with dust removal means suited to a device from FIG. 14.

The opening 97 is excellently suited for the attachment of a flexible tube, as is shown in FIG. 15. This flexible tube 98 is connected to a handgrip 100 which is fastened in the usual way by means of a mounting ring to the housing 1. The handgrip 100 is made hollow and comprises a dust bag 101, which is arranged freely inside the handgrip. The dust bag extends from bottom to top and is firmly mounted on the central intake opening 102 inside the handgrip, which stands in connection with a second flexible tube 103. This flexible tube leads to a drill foot 104, which may be joined in known fashion with the handgrip through rod 105. Dust produced by drilling can be led through the hollow drill foot 104 and the tube 103 into the dust bag 101, the air stream being engendered by the fan 90 of the electric motor.

Figure 16:
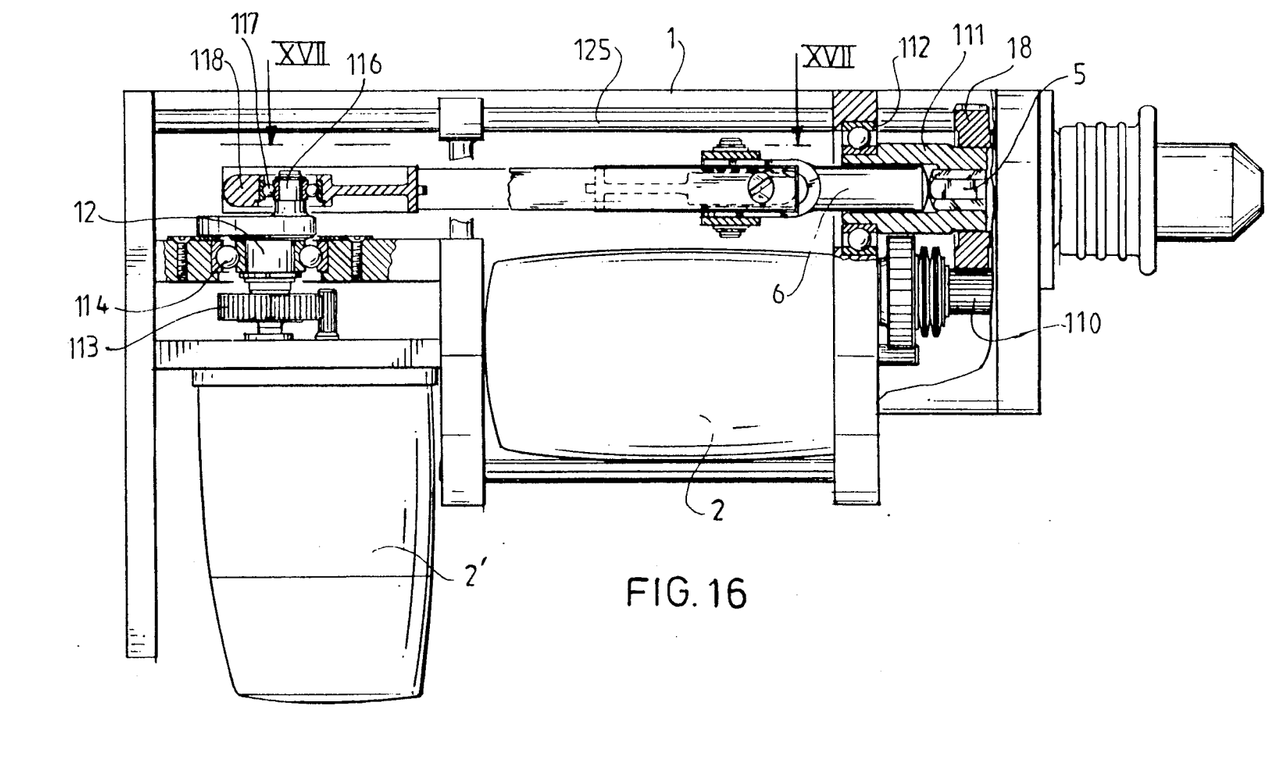
FIG. 16 shows an axial cross section corresponding to FIG. 1 of an electric hand tool according to an eighth version having two drive motors.
Figure 17:
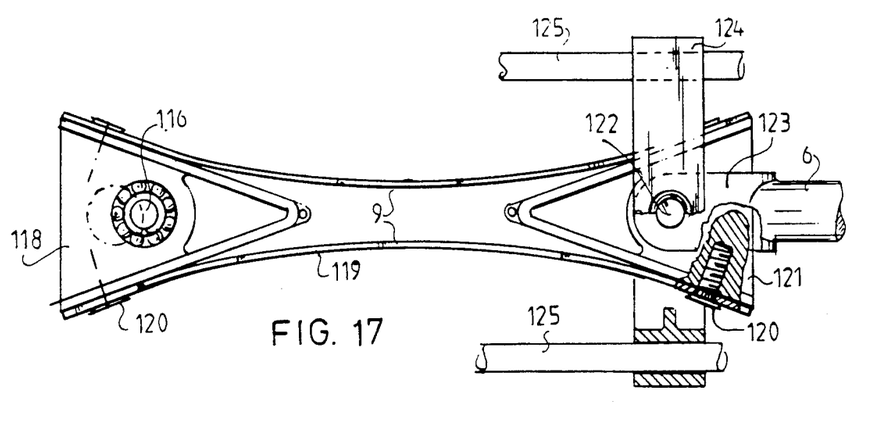
FIG. 17 shows a top view of a part of the device of FIG. 16 according to the line XVII—XVII.

FIGS. 16 and 17 show an embodiment in which the hammer and rotary drilling apparatus is provided with two driving motors 2 and 2', whereof motor 2 serves for the bringing into rotation of tool spindle 5 by way of transmission 110. Tool spindle 5 is mounted in a bushing 111 which is rotatably held by rolling bearings 112 in housing 1 of the machine. The bushing 111 is provided with gear wheel 18 which cooperates with the pinion of the shaft of motor 2. The bushing 111 moreover accommodates percussion body 6, such that the end face of percussion body 6 can come into contact with the end face of tool spindle 5.

The motor 2' serves for the driving of a percussion body, to which end the motor drives via a first transmission 113, an intermediate shaft 12 which is mounted by means of rolling bearing 114 in the housing 1. The side of transmission 113 remote from the intermediate shaft 12 is provided with concentric disc 115, concentric pin 116 being mounted by means of rolling bearing 117 in drive member 118. The drive member has in top view a triangular form (see FIG. 17) and is so positioned that the top angle of the triangle is disposed towards percussion body 6. Along each side of the triangle there is mounted an elastic member 9 in the form of a strip spring 119 to the drive member 118 which can take place in arbitrary fashion, for example using screws 120.

At the side close to percussion body 6, the end of each strip spring is similarly fastened to a triangular body 121, of which the form corresponds to that of drive member 118. The fastening similarly takes place by means of screws 120. The triangular member 121 is provided with pin 122, onto which a fork-shaped end part 123 of percussion member 6 grips rotatably. Also coupled to pin 122 is a transverse guide member 124, which member is slidably conducted along parallel guide bars 125. The bars are firmly mounted in housing 1.

In this embodiment drive member 118 is mounted rotatably around a motor shaft or a shaft cooperating therewith, which drive member so loads a pair of elastic members 119 that on the actuation of motor 2' and as a consequence of concentric members 115 and 116, the distance between the members 118 and 121 is repeatedly enlarged and reduced. This causes a flexing of flexible members 119, which members uncoil against the flanks of triangular members 118 and 121, which results in a non-linear spring characteristic. The percussion body 6, which is held freely slidable in housing 1, follows the reciprocating motion of drive member 118 in a delayed manner, such that the strip springs 119 are stretched to a greater or lesser extent. The percussion body 6 thereby repeatedly reaches the end face of tool spindle 5, which can be bought into rotation by the empowerment of motor 2.

The above described device can therefore have three functions, namely rotary drilling only, hammering only or a combination of hammer and rotary drilling. In the last case the full power of the two motors can be utilized, which results in a doubling of the power in comparison to the other embodiments.

While the preferred embodiments have been described, variations thereto will occur to those skilled in the art within the scope of the present inventive concept which are delineated by the claims which follow. The invention is not restricted to the embodiments described hereinabove.

We claim:

1. Apparatus for driving a percussion tool provided with a spindle held rotatably in a housing, said spindle having a first end and a second end, the first end is suitable for fastening to said tool and the second end is accessible to an oscillating percussion body movable in said housing by means of a guideway, a rotatable driving shaft actuates said percussion body by a transmission, said transmission being Provided with means for conversion of the rotary motion of the drive shaft into an oscillatory motion of an associated drive member, said drive member joining said percussion body through an associated elastic member having non-linear spring attributes, characterized in that said drive member has a plate-like member, said drive member is mounted on the drive shaft, said elastic member is operatively connected to said plate-like member and is provided with a coupling means for engaging said percussion body.

2. The apparatus of claim 1 wherein said drive member is operatively mounted at, or can be adjusted to, an angle deviating 90 degrees from the center line of said drive shaft, said plate-like member being rotatably arranged on said drive member.

3. The apparatus of claim 2 wherein said coupling means has a tongue fastened to said plate-like member, which protrudes into an aperature, said aperature having a stroke direction, disposed in the percussion body.

4. The apparatus of claim 3 wherein said aperature has in said stroke direction a larger diversion than the thickness of said tongue.

5. The apparatus of claim 3 wherein said tongue is the end of a circuitous-shaped spring arm.

6. The apparatus of claim 1 wherein said coupling means has a tongue fastened to said plate-like member, which protrudes into an aperature, said aperature having a stroke direction, disposed in the percussion body.

7. The apparatus of claim 6 wherein said aperature has in said stroke direction a larger dimension than the thickness of said tongue.

8. The apparatus of claim 6 wherein said tongue is the end of a circuitous-shaped spring arm.

9. The apparatus of claim 1 wherein said elastic body spring plate is arranged so that the spring constant is less than that of said elastic member.

10. The apparatus of claim 1 wherein said plate-like member is mounted rotatably on a drive member embodied around the axis as a support member.

11. The apparatus of claim 10 wherein said support member is mounted tiltably with respect to said axis.

12. The apparatus of claim 1 wherein said percussion body is a pin freely movable with respect to said housing.

13. The apparatus of claim 12 wherein said percussion body is held in Place by a plurality of slide bearings supported by said housing.

14. The apparatus of claim 12 wherein said percussion body is suspended in said housing by means of one or more spring strip members.

15. The apparatus of claim 14 wherein at least one pair of parallel spring strip members are arranged around said percussion body.

16. The apparatus of claim 12 wherein said percussion body is accommodated in a drilled hole made in said spindle.

17. The apparatus of claim 1 wherein said drive member has a bearing motor shaft which has a coupling on the side of the driving motor.

18. The apparatus of claim 17 wherein said coupling in said drive shaft is of the groove and tongue type and is arranged close to a supporting bearing.

19. The apparatus of claim 1 wherein a coupling is incorporated between the drive element and the shaft that carries said drive element, said coupling capable of being engaged and released independently of the rotation of said drive shaft.

20. The apparatus of claim 19 wherein said coupling can be actuated by means of an axial displacement of said spindle.

21. The apparatus of claim 19 wherein said coupling is a slip clutch and is provided with a plurality of ball members.

22. The apparatus of claim 1 wherein said spindle is provided with a transmission gear wheel freely rotatable with respect thereto, and a hand-operated coupling is arranged between said spindle and said gear wheel.

23. The apparatus of claim 22 wherein said coupling is embodied as a friction-slip clutch.

24. The apparatus of claim 23 wherein one or more of the intake passageways is suitable for the receiving of an air conduit tube, said air conduit tube optionally provided with a filter.

25. The apparatus of claim 1 wherein said housing is divided into compartments by means of partitions wherein one or more partitions has a passageway for the venting of air, said air stream is a result of the blade wheel member of the electric motor.

26. The apparatus of claim 25 wherein said blade wheel member is embodied in twin form.

27. The apparatus of claim 1 wherein said spindle has an end face and is provided with a holding device for said tool, which holding device is so disposed that said tool comes into direct contact with the end face of the spindle.

28. The apparatus of claim 27 wherein said holding device is provided with coupling means for, at one side, said spindle and, at the other side, for said tool, which excludes a rotation, but permits an axial displacement.

29. The apparatus of claim 28 wherein said coupling means are formed by roller bodies accommodated in recesses, whereof at least some of said recesses display an axial length which is greater than the length of said roller bodies.

30. Apparatus for driving a combination drilling and percussion tool provided with a spindle held rotatably in a housing, said spindle having a first end and a second end, the first end is suitable for fastening to said tool and the second end is accessible to an oscillating percussion body movable in said housing by means of a guideway, a rotatable driving shaft actuates said percussion body by a transmission, said transmission being provided with means for conversion of the rotary motion of the drive shaft into an oscillatory motion of an associated drive member, said drive member joining said percussion body through an associated elastic member having non-linear spring attributes, characterized in that said drive member has a plate-like member, said drive member is mounted on the drive shaft, said elastic member is operatively connected to said plate-like member and is provided with a coupling means for engaging said percussion body.

31. The apparatus of claim 30 wherein said drive member is operatively mounted at, or can be adjusted to, an angle deviating 90 degrees from the center line of said drive shaft, said plate-like member being rotatably arranged on said drive member.

32. The apparatus of claim 31 wherein said coupling means has a tongue fastened to said plate-like member, which protrudes into an aperature, said aperature having a stroke direction, disposed in the percussion body.

33. The apparatus of claim 31 wherein said aperature has in said stroke direction a larger dimension than the thickness of said tongue.

34. The apparatus of claim 31 wherein said tongue is the end of a circuitous-shaped spring arm.

35. The apparatus of claim 30 wherein said coupling means has a tongue fastened to said plate-like member, which protrudes into an aperature, said aperature having a stroke direction, disposed in the percussion body.

36. The apparatus of claim 35 wherein said aperature has in said stroke direction a larger dimension than the thickness of said tongue.

37. The apparatus of claim 35 wherein said tongue is the end of a circuitous-shaped spring arm.

38. The apparatus of claim 30 wherein said elastic body spring plate is arranged so that the spring constant is less than that of said elastic member.

39. The apparatus of claim 30 wherein said plate-like member is mounted rotatably on a drive member embodied around the axis as a support member.

40. The apparatus of claim 39 wherein said support member is mounted tiltably with respect to said axis.

41. The apparatus of claim 30 wherein said percussion body is a pin freely movable with respect to said housing.

42. The apparatus of claim 41 wherein said percussion body is held in place by a plurality of slide bearings supported by said housing.

43. The apparatus of claim 41 wherein said percussion body is suspended in said housing by means of one or more spring strip members.

44. The apparatus of claim 43 wherein at least one pair of parallel spring strip members are arranged around said percussion body.

45. The apparatus of claim 41 wherein said percussion body is accommodated in a drilled hole made in said spindle.

46. The apparatus of claim 30 wherein said drive member has a bearing motor shaft which has a coupling on the side of the driving motor.

47. The apparatus of claim 46 wherein said coupling in said drive shaft is of the groove and tongue type and is arranged close to a supporting bearing.

48. The apparatus of claim 30 wherein a coupling is incorporated between the drive element and the shaft that carries said drive element, said coupling capable of being engaged and released independently of the rotation of said drive shaft.

49. The apparatus of claim 48 wherein said coupling can be actuated by means of an axial displacement of said spindle.

50. The apparatus of claim 48 wherein said coupling is a slip clutch and is provided with a plurality of ball members.

51. The apparatus of claim 30 wherein said spindle is provided with a transmission gear wheel freely rotatable with respect thereto, and a hand-operated coupling is arranged between said spindle and said gear wheel.

52. Apparatus of claim 51 wherein said coupling is embodied as a friction-slip clutch.

53. The apparatus of claim 30 wherein said housing is divided into compartments by means of partitions characterized in that one or more partitions has a passageway for the venting of air, said air stream is a result of the blade wheel member of the electric motor.

54. The apparatus of claim 53 wherein said blade wheel member is embodied in twin form.

55. The apparatus of claim 54 wherein one or more of the intake passageways is suitable for the receiving of an 56. The apparatus of claim 30 wherein said spindle has an end face and is provided with a holding device for said tool, which holding device is so disposed that said tool comes into direct contact with the end face of the spindle.

57. The apparatus of claim 56 wherein said holding device is provided with coupling means for, at one side, said spindle and, at the other side, for said tool, which excludes a rotation, but permits an axial displacement.

58. The apparatus of claim 57 wherein said coupling means are formed by roller bodies accommodated in recesses, whereof at least some of said recesses display an axial length which is greater than the length of said roller bodies.

* * * * *